US012541453B2

(12) United States Patent
Patsilaras et al.

(10) Patent No.: US 12,541,453 B2
(45) Date of Patent: Feb. 3, 2026

(54) RECONFIGURABLE SHARED MEMORY SYSTEMS, AND RELATED PROCESSOR-BASED SYSTEMS AND METHODS

(71) Applicant: QUALCOMM Incorporated, San Diego, CA (US)

(72) Inventors: George Patsilaras, San Diego, CA (US); Sparsh Singhai, San Diego, CA (US); Subbarao Palacharla, San Diego, CA (US); Simon Peter William Booth, San Diego, CA (US); Girish Bhat, San Diego, CA (US); Ling Feng Huang, San Diego, CA (US); Scott Cheng, Foothill Ranch, CA (US); Yen-Kuan Wu, San Diego, CA (US); Mohammad Tamjidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 18/484,950

(22) Filed: Oct. 11, 2023

(65) Prior Publication Data

US 2024/0370369 A1 Nov. 7, 2024

Related U.S. Application Data

(60) Provisional application No. 63/499,663, filed on May 2, 2023.

(51) Int. Cl.
*G06F 12/06* (2006.01)
*G06F 12/0873* (2016.01)

(52) U.S. Cl.
CPC ...... *G06F 12/0638* (2013.01); *G06F 12/0873* (2013.01)

(58) Field of Classification Search
CPC ............. G06F 12/0638; G06F 12/0873; G06F 12/0646; G06F 15/7867
(Continued)

(56) References Cited

U.S. PATENT DOCUMENTS

| | | | | |
|---|---|---|---|---|
| 5,915,265 A * | 6/1999 | Crocker | G06F 12/0223 711/170 |
| 2019/0042404 A1 * | 2/2019 | Subramanian | G06F 12/0246 |
| 2023/0029696 A1 * | 2/2023 | Bhat | G06F 1/3275 |

OTHER PUBLICATIONS

International Search Report and Written Opinion for International Patent Application No. PCT/US2024/020380, mailed Jul. 24, 2024, 15 pages.

* cited by examiner

*Primary Examiner* — Jared I Rutz
*Assistant Examiner* — Edward Waddy, Jr.
(74) *Attorney, Agent, or Firm* — W&T

(57) ABSTRACT

Reconfigurable shared memory systems, and related processor-based systems and methods are disclosed. The reconfigurable shared memory system can be included in a processor-based system to provide memory for data storage. In exemplary aspects, the reconfigurable shared memory system not only includes the dedicated memory and the general memory (e.g., system cache memory), but also includes a reconfigurable memory. The reconfigurable memory can be configured as either part of addressable memory space of the dedicated memory if an application requires such additional dedicated memory, and/or configured as part of the addressable memory space of the general memory to provide additional memory to other clients for increased processing performance if such reconfigurable memory is not needed as part of the dedicated memory. The dedicated memory does not have to be sized to the worst-case size requirements of a given application.

29 Claims, 6 Drawing Sheets

(58) Field of Classification Search
USPC .................... 711/154, 170, 12.078, 203, 118
See application file for complete search history.

RECONFIGURABLE SHARED MEMORY SYSTEMS, AND RELATED PROCESSOR-BASED SYSTEMS AND METHODS

PRIORITY APPLICATION

The present application claims priority to U.S. Provisional Patent Application Ser. No. 63/499,663, filed May 2, 2023 and entitled "RECONFIGURABLE SHARED MEMORY SYSTEMS, AND RELATED PROCESSOR-BASED SYSTEMS AND METHODS," which is incorporated herein by reference in its entirety.

BACKGROUND

I. Field of the Disclosure

The technology of the disclosure relates generally to computer memory systems that include memory(ies) such as cache memory and system memory, used to store data in processor-based systems.

II. Background

Processor-based computer systems include memory for data storage. Producers of data can write data to memory, which can then be retrieved by consumers of such data from memory to perform a computer operation. Different types of memory exist, each possessing certain unique features. For example, static random access memory (SRAM) is a type of memory that can be employed in processor-based computer systems. SRAM can store data without the need to periodically refresh the memory, unlike dynamic random access memory (DRAM), for example. Thus, SRAM may be a more reliable memory as it is less likely to lose data due to power loss or other power related issues. As an example, SRAM may be employed in cache memory systems and other memory where fast memory accesses are needed or desired. As another example, DRAM may be employed in system memory that has a larger memory space where increased memory density may be advantageous, because DRAM has smaller memory cells than SRAM. DRAM also requires less power to operate. If the processor-based system is a system-on-a-chip (SoC), for example, SRAM-provided memory storage for the processor may be located on-chip.

To conserve power consumption and/or to provide faster memory accesses in memory systems, data shared in a producer-consumer relationship can be allocated into SRAM, for example, instead of DRAM. Accesses to SRAM is generally faster than DRAM. Also, accesses to DRAM may incur longer latency than accesses to SRAM, because DRAM is typically used in system memory that is located farther away from a processor than SRAM that is typically used in cache memory.

One example of such a producer-consumer relationship in a processor-based system is color space conversion in an augmented reality (AR) processor-based system. Computing devices may be used for virtual reality and/or augmented reality applications. For example, a virtual reality computing device and a camera-see-through augmented reality device can display an imaged real-world object on a screen along with computer generated information, such as an image or textual information. Virtual reality and augmented reality can be used to provide information, either graphical or textual, about a real-world object, such as a building or product. In color space conversion in such AR processor-based systems, a frame buffer of a certain format (e.g., YUV color model) is converted to a different format more compatible with other processor algorithms (e.g., red-green-blue (RGB) buffers) consumed by a display pipeline in the processor. An efficient implementation of such an application is to use a dedicated on-chip SRAM as a temporary scratchpad memory to temporarily store such frame buffers to be shared between a creating producer writing such frame buffers to memory and a consumer that then reads the frame buffers through read operations. SRAM may be used for this application, as opposed to DRAM system memory, to provide for lower latency memory accesses which may be required to meet a scan-out deadline, for example, augmented reality. This dedicated-on-chip SRAM for storing frame buffers would be partitioned separate and apart from other general SRAM that is used by clients for other storage needs.

SUMMARY OF THE DISCLOSURE

Aspects disclosed herein include reconfigurable shared memory systems. Related processor-based systems and methods are also disclosed. The reconfigurable shared memory system can be included in a processor-based system, such as a system-on-a-chip (SoC), to provide memory for storing and accessing data to perform computer operations. For example, the reconfigurable shared memory system may be a static random-access memory (SRAM) reconfigurable shared memory system that includes SRAM to facilitate lower latency memory accesses. The reconfigurable shared memory system is partitioned to include a dedicated memory that is dedicated to a particular client(s) in the processor-based system, and a general memory that is available for use by many clients in the processor-based system. For example, if the processor-based system includes a graphics processing unit (GPU), the dedicated memory may be dedicated to be exclusively accessed to store a frame buffer (e.g., a display or video buffer) to store the contents of an image that will be displayed on a screen. This allows the GPU to access and manipulate image data more quickly and efficiently to meet scan-out deadlines than if the GPU had to constantly read and write such data from a cache memory that would involve evictions or to system memory that has higher memory access latency. However, providing dedicated memory can result in underutilization of such memory if the GPU does not require the entire size of the dedicated memory to be available for a given application or use case. Thus, in exemplary aspects, to avoid or mitigate a portion of the dedicated memory in the shared memory system not being fully utilized if a given application or use case of the processor-based system does not require a larger sized dedicated memory, the shared memory system is provided as a reconfigurable shared memory system. In this regard, the reconfigurable shared memory system not only includes the dedicated memory and the general memory (e.g., system cache memory), but also includes a reconfigurable memory. The reconfigurable memory can be configured either as part of addressable memory space of the dedicated memory if an application requires such additional dedicated memory, or as part of the addressable memory space of the general memory to provide additional memory to other clients for increased processing performance if such reconfigurable memory is not needed as part of the dedicated memory.

In this manner, as an example, the dedicated memory in the reconfigurable shared memory system does not have to be sized to the worst-case size requirements of a given application of the processor-based system. Instead, as an example, the combination of the dedicated memory and reconfigurable memory can be sized to the worst-case size requirements for addressable dedicated memory for a given application or configuration of the processor-based system. Thus, if a given application or configuration of the processor-based system requires a dedicated memory of the combined size of the dedicated memory and reconfigurable memory, the dedicated memory and reconfigurable memory can be configured as part of the addressable memory space in the dedicated memory of the reconfigurable shared memory system. However, if a given application or configuration of the processor-based system does not need access to a dedicated memory that exceeds the memory size of the dedicated memory, the reconfigurable memory can instead be configured as part of the addressable memory address space for general memory to be generally available to other clients. In this manner, the dedicated memory provided in the reconfigurable shared memory system is less likely to be underutilized. This can also result in the ability to reduce die area for memory. The ability to reconfigure the reconfigurable memory as part of the general memory or the dedicated memory means that the general memory and/or the dedicated memory could be designed of reduced memory size that may otherwise be desired if both memories had to be individually sized for their worst-case memory size scenarios.

In another exemplary aspect, the general memory of the reconfigurable shared memory system can be part of a cache memory system in the processor-based system. Such a reconfigurable shared memory system includes a cache controller that has access to the general memory as a cache memory (e.g., a shared cache memory). The reconfigurable shared memory system can also include a dedicated memory controller that has access to the dedicated memory. If the reconfigurable memory is configured as part of the general memory, the cache controller will have addressable access to the general memory that includes both general memory and the reconfigurable memory, and the dedicated memory controller will have addressable access to the dedicated memory as the dedicated memory. If, however, the reconfigurable memory is configured as part of the dedicated memory, the cache controller will have addressable access to the general memory that includes the general memory, and the dedicated memory controller will have addressable access to the dedicated memory and the reconfigurable memory as the dedicated memory.

In this regard, in one exemplary aspect, a memory system is provided. The memory system comprises a general memory having a first memory address space. The memory system also comprises a dedicated memory having a second memory address space. The memory system also comprises a reconfigurable memory having a third memory address space. The memory system also comprises a reconfiguration memory direction circuit coupled to the reconfigurable memory. The reconfiguration memory direction circuit is configured to assign the third memory address space of the reconfigurable memory to the first memory address space of the general memory, in response to a reconfigurable memory configuration for the reconfigurable memory indicating a general memory mapping configuration. The reconfiguration memory direction circuit is also configured to assign the third memory address space of the reconfigurable memory to the second memory address space of the dedicated memory, in response to the reconfigurable memory configuration for the reconfigurable memory indicating a dedicated memory mapping configuration.

In another exemplary aspect, a method of reconfiguring a reconfigurable memory as part of addressable address space of another memory in a memory system is provided. The method comprises determining a third memory address space of a reconfigurable memory as being assigned to one of a general memory having a first memory address space and a dedicated memory having a second memory address space. The method also comprises assigning the third memory address space of the reconfigurable memory to the first memory address space of the general memory, in response to determining the third memory address space is assigned to the general memory. The method also comprises assigning the third memory address space of the reconfigurable memory to the second memory address space of the dedicated memory, in response to determining the third memory address space is assigned to the dedicated memory.

DETAILED DESCRIPTION

Figure 1:
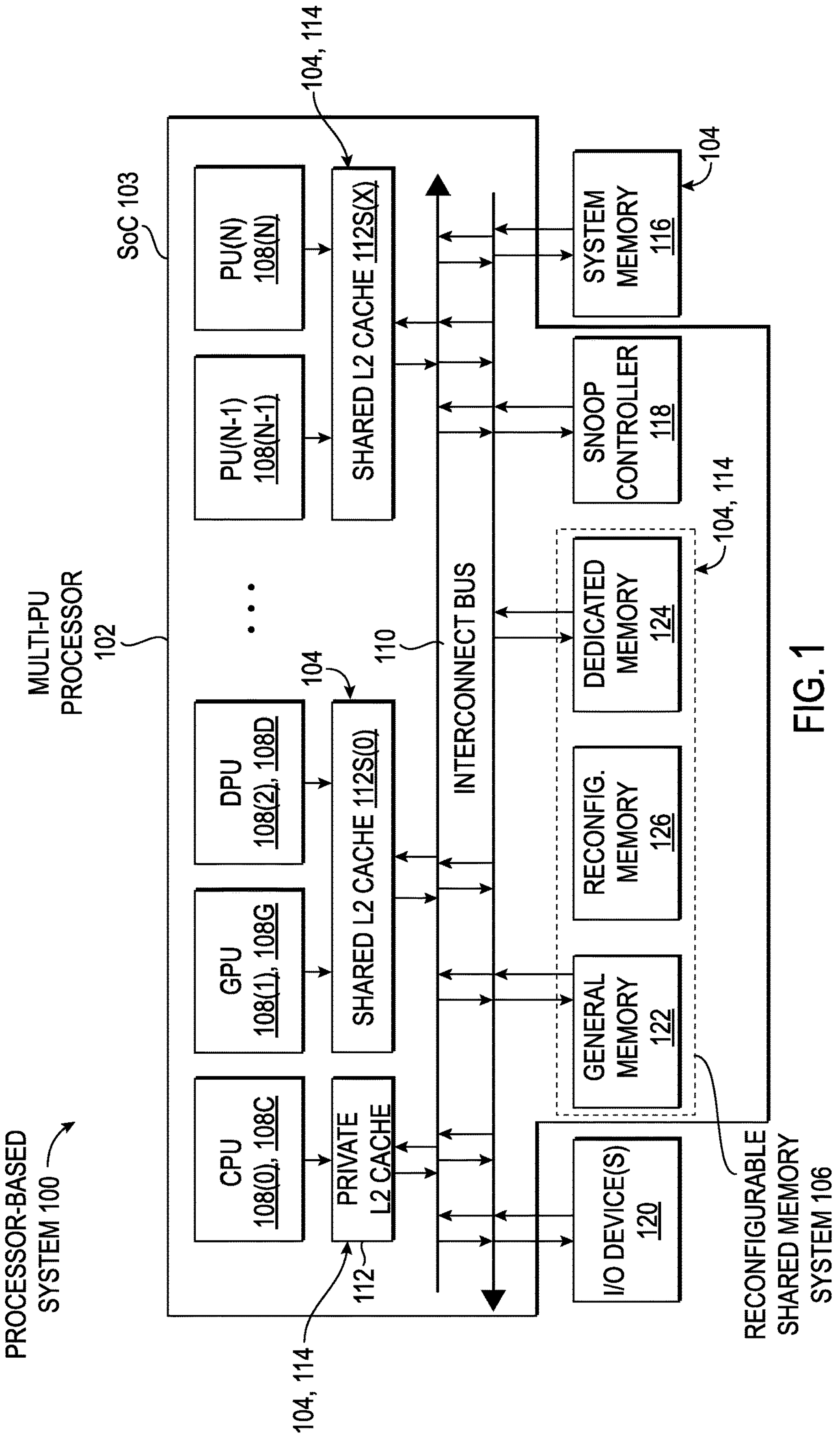
FIG. 1 is a block diagram of an exemplary processor-based system that includes multiple central processing units (CPUs) and a memory system that includes a reconfigurable shared memory system that includes a dedicated memory, a general memory, and a reconfigurable memory configured to be in the memory address space of either the dedicated memory and/or the general memory.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include reconfigurable shared memory systems. Related processor-based systems and methods are also disclosed. The reconfigurable shared memory system can be included in a processor-based system, such as a system-on-a-chip (SoC), to provide memory for storing and accessing data to perform computer operations. For example, the reconfigurable shared memory system may be a static random-access memory (SRAM) reconfigurable shared memory system that includes SRAM to facilitate lower latency memory accesses. The reconfigurable shared memory system is partitioned to include a dedicated memory that is dedicated to a particular client(s) in the processor-based system, and a general memory that is available for use by many clients in the processor-based system. For example, if the processor-based system includes a graphics processing unit (GPU), the dedicated memory may be dedicated to be exclusively accessed to store a frame buffer (e.g., a display or video buffer) to store the contents of an image that will be displayed on a screen. This allows the GPU to access and manipulate image data more quickly and efficiently to meet scan-out deadlines than if the GPU had to constantly read and write such data from a cache memory that would involve evictions or to system memory that has higher memory access latency. However, providing dedicated memory can result in underutilization of such memory if the GPU does not require the entire size of the dedicated memory to be available for a given application or use case. Thus, in exemplary aspects, to avoid or mitigate a portion of the dedicated memory in the shared memory system not being fully utilized if a given application or use case of the processor-based system does not require a larger sized dedicated memory, the shared memory system is provided as a reconfigurable shared memory system. In this regard, the reconfigurable shared memory system not only includes the dedicated memory and the general memory (e.g., system cache memory), but also includes a reconfigurable memory. The reconfigurable memory can be configured either as part of addressable memory space of the dedicated memory if an application requires such additional dedicated memory, or as part of the addressable memory space of the general memory to provide additional memory to other clients for increased processing performance if such reconfigurable memory is not needed as part of the dedicated memory.

In this manner, as an example, the dedicated memory in the reconfigurable shared memory system does not have to be sized to the worst-case size requirements of a given application of the processor-based system. Instead, as an example, the combination of the dedicated memory and reconfigurable memory can be sized to the worst-case size requirements for addressable dedicated memory for a given application or configuration of the processor-based system. Thus, if a given application or configuration of the processor-based system requires a dedicated memory of the combined size of the dedicated memory and reconfigurable memory, the dedicated memory and reconfigurable memory can be configured part of the addressable memory space of the dedicated memory of the reconfigurable shared memory system. However, if a given application or configuration of the processor-based system does not need access to a dedicated memory that exceeds the memory size of the dedicated memory, the reconfigurable memory can instead be configured as part of the addressable memory address space for general memory to be generally available to other clients. In this manner, the dedicated memory provided in the reconfigurable shared memory system is less likely to be underutilized. This can also result in the ability to reduce die area for memory. The ability to reconfigure the reconfigurable memory as part of the general memory or the dedicated memory means that the general memory and/or the dedicated memory could be designed of reduced memory size that may otherwise be desired if both memories had to be individually sized for their worst-case memory size scenarios.

In this regard, FIG. 1 is a block diagram of an exemplary processor-based system 100 that includes a multiple processing unit (PU) processor 102 ("processor 102") and a memory system 104 with a reconfigurable shared memory system 106. The processor 102 includes a plurality of PUs 108(0)-108(N) which may include any variations of the same or different PUs. For example, the processor 102 may be provided in a system-on-a-chip (SoC) 103. As an example, PU 108(0) may be a central processing unit (CPU) 108C, PU 108(1) may be a graphics processing unit (GPU) 108G, and PU 108(2) may be a data processing unit (DPU) 108(3). Each of the PUs 108(1)-108(N) are configured to process memory access requests to the memory system 104 for storage and retrieval of data through an internal interconnect bus 110, which may be a coherent bus. For example, in this example, PU 108(0) includes a private local cache memory 112 as part of the memory system 104, wherein the cache memory 112 may be a Level 2 (L2) cache memory. PUs 108(2), 108(3) and PUs 108(N−1), 108(N) are configured to interface with respective local shared cache memories 112S(0)-112S(X) also part of the memory system 104, which may also be L2 cache memories, for example.

If a data read request requested by a PU 108(0)-108(N) results in a cache miss to the respective cache memories 112, 112S(0)-112S(X), the read request may be communicated to a next level cache memory, which in this example is the reconfigurable shared memory system 106 as part of the memory system 104. The reconfigurable shared memory system 106 may be a Level 3 (L3) cache memory, as an example. The local shared cache memories 112S(0)-112S(X) and the reconfigurable shared memory system 106 are also part of a cache memory system 114. The local shared cache memories 112S(0)-112S(X) and the reconfigurable shared memory system 106 may be static random access memories (SRAMs) for the benefit of lower memory access latency. The internal interconnect bus 110 facilitates each of the PUs 108(0)-108(N) accessing the reconfigurable shared memory system 106 for memory access requests. If a miss occurs to the cache memory system 114, a system memory 116 in the memory system 104 is accessed. The system memory 116 may be a dynamic random access memory (DRAM) for the benefit of increased memory density and because the presence of the cache memory system 114 may mitigate the need for the system memory 116 to have lower memory access latency.

With continuing reference to FIG. 1, the processor-based system 100 in this example also includes a snoop controller 118 which is also coupled to the interconnect bus 110. The snoop controller 118 is a circuit that monitors or snoops cache memory bus transactions on the interconnect bus 110 to maintain cache coherency among the cache memories 112, 112S(0)-112S(X), 106 in the cache memory system 114. Other shared resources that can be accessed by the PUs 108(0)-108(N) through the interconnect bus 110 can include input/output (I/O) devices 120 and the system memory 116. If a cache miss occurs for a read request issued by a PU 108(0)-108(N) in each level of the cache memories 112, 112S(0)-112S(X), 106 accessible for the PU 108(0)-108(N), the read request is serviced by the system memory 116 and the data associated with the read request is installed in the cache memories 112, 112S(0)-112S(X), 106 associated with the requested PU 108(0)-108(N).

The reconfigurable shared memory system 106 in the processor-based system 100 is partitioned to include a general memory 122 and a dedicated memory 124. The general memory 122 is memory that is generally accessible by all of the PUs 108(0)-108(N) and their clients for performing memory access requests. However, the dedicated memory 124 in this example is dedicated to a particular client(s) in the processor-based system 100. For example, the dedicated memory 124 may be dedicated to be exclusively accessed to store a frame buffer (e.g., a display or video buffer) by a GPU 108G to store the contents of an image that will be displayed on a screen. This allows the GPU 108G access and manipulation of image data more quickly and efficiently to meet scan-out deadlines than if the GPU 108G had to constantly read and write such data from the general memory 122 that would involve evictions or to system memory 116 that has higher memory access latency. However, providing the dedicated memory 124 that is accessed for specific, dedicated clients or applications can result in underutilization of the reconfigurable shared memory system 106 if, for example, the GPU 108G does not require the entire size of the dedicated memory 124 to be available for a given application or use case.

For example, if the dedicated memory 124 in the reconfigurable shared memory system 106 in FIG. 1 were used to store a frame buffer for scan-out to a display, the dedicated memory 124 needs to have enough memory space to store the frame buffer. However, the processor-based system 100 may be flexible enough to be configured for displays that require different size frame buffers. For example, if the processor-based system 100 is capable of being configured to store a frame buffer for scan-out of a display of a 1600×1200 resolution, this would require the dedicated memory 124 having an eleven (11) Megabyte (MB) memory size and memory address space. However, if the processor-based system 100 is capable of being configured to store a frame buffer for scan-out of a display of a higher 1536×1536 resolution, this would require the dedicated memory 124 having a fourteen (14) MB memory size and memory address space. Thus, if the dedicated memory 124 is sized for the worst-case of these two (2) exemplary options, the dedicated memory 124 would have to be provided with a memory size of at least fourteen (14) MB. However, if the processor-based system 100 is configured in a particular application to support display of the lower 1600×1200 resolution, three (3) MB of the fourteen (14) MB memory space of the dedicated memory 124 may be unutilized, referred to as "dark silicon." This is because the memory system 104 is configured such that the dedicated memory 124 is only accessible by dedicated, select clients or applications for which the dedicated memory 124 is exclusively allocated for its use.

However, as discussed in more detail below, in exemplary aspects, to avoid or mitigate a portion of the dedicated memory 124 in the reconfigurable shared memory system 106 not being fully utilized if a given application or use case of the processor-based system 100 does not require a larger sized dedicated memory 124, the reconfigurable shared memory system 106 is provided as reconfigurable shared memory. In this regard, the reconfigurable shared memory system 106 not only includes the dedicated memory 124 and the general memory 122, but also includes a reconfigurable memory 126. For example, the reconfigurable memory 126 could be an SRAM. The memory address space of the reconfigurable memory 126 can be configured as part of addressable memory space of the dedicated memory 124 if an application requires such additional dedicated memory. Alternatively, the memory address space of the reconfigurable memory 126 can be configured as part of the addressable memory space of the general memory 122 to provide additional memory to other clients for increased processing performance if such reconfigurable memory 126 is not needed as part of the dedicated memory 124.

In this manner, the dedicated memory 124 in the reconfigurable shared memory system 106 does not have to be sized to the worst-case size requirements of a given application of the processor-based system 100. Instead, as an example, the combination of the dedicated memory 124 and the reconfigurable memory 126 can be sized to the worst-case size requirements for addressable dedicated memory for a given application or configuration of the processor-based system 100. Thus, if a given application or configuration of the processor-based system 100 requires a dedicated memory of the combined size of the dedicated memory 124 and the reconfigurable memory 126, the dedicated memory 124 and the reconfigurable memory 126 can be configured as part of the addressable memory space for the dedicated memory 124 in the reconfigurable shared memory system 106. However, if a given application or configuration of the processor-based system 100 does not need access to dedicated memory that exceeds the memory size of the dedicated memory 124, the reconfigurable memory 126 can instead be configured as part of the addressable memory address space for the general memory 122 to be generally available to other clients. In this manner, the dedicated memory 124 provided in the reconfigurable shared memory system 106 is less likely to be underutilized. This can also result in the ability to reduce die area for the memory system 104. The ability to reconfigure the reconfigurable memory 126 as part of the general memory 122 or the dedicated memory 124 means that the general memory 122 and/or the dedicated memory 124 could be designed of reduced memory size that may otherwise be desired if both memories had to be individually sized for their worst-case memory size scenarios for the processor-based system 100.

Figure 2:
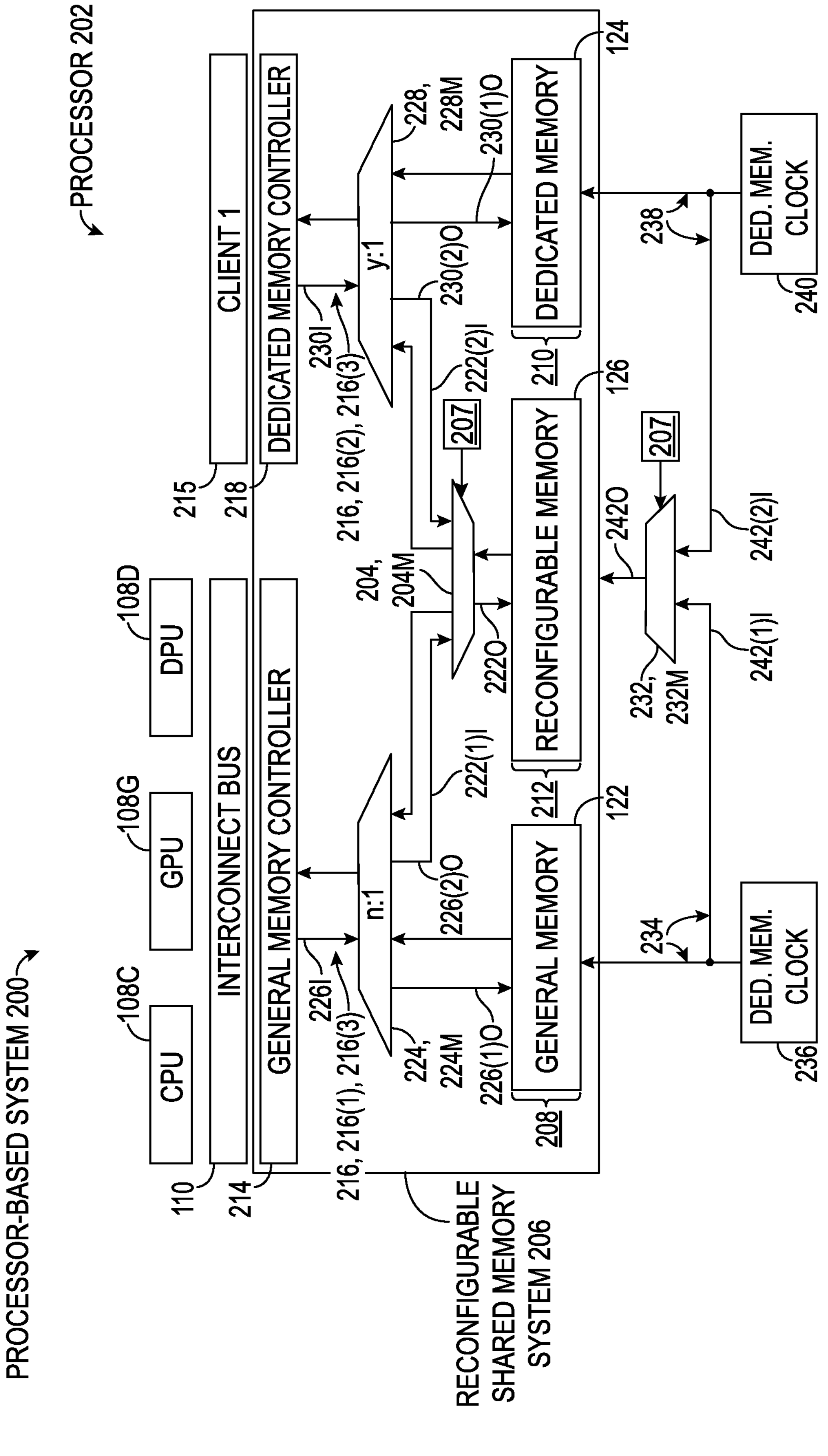
FIG. 2 is a block diagram illustrating a more detailed, exemplary reconfigurable shared memory system that can be provided as the reconfigurable shared memory system in the memory system in FIG. 1.
Figure 3:
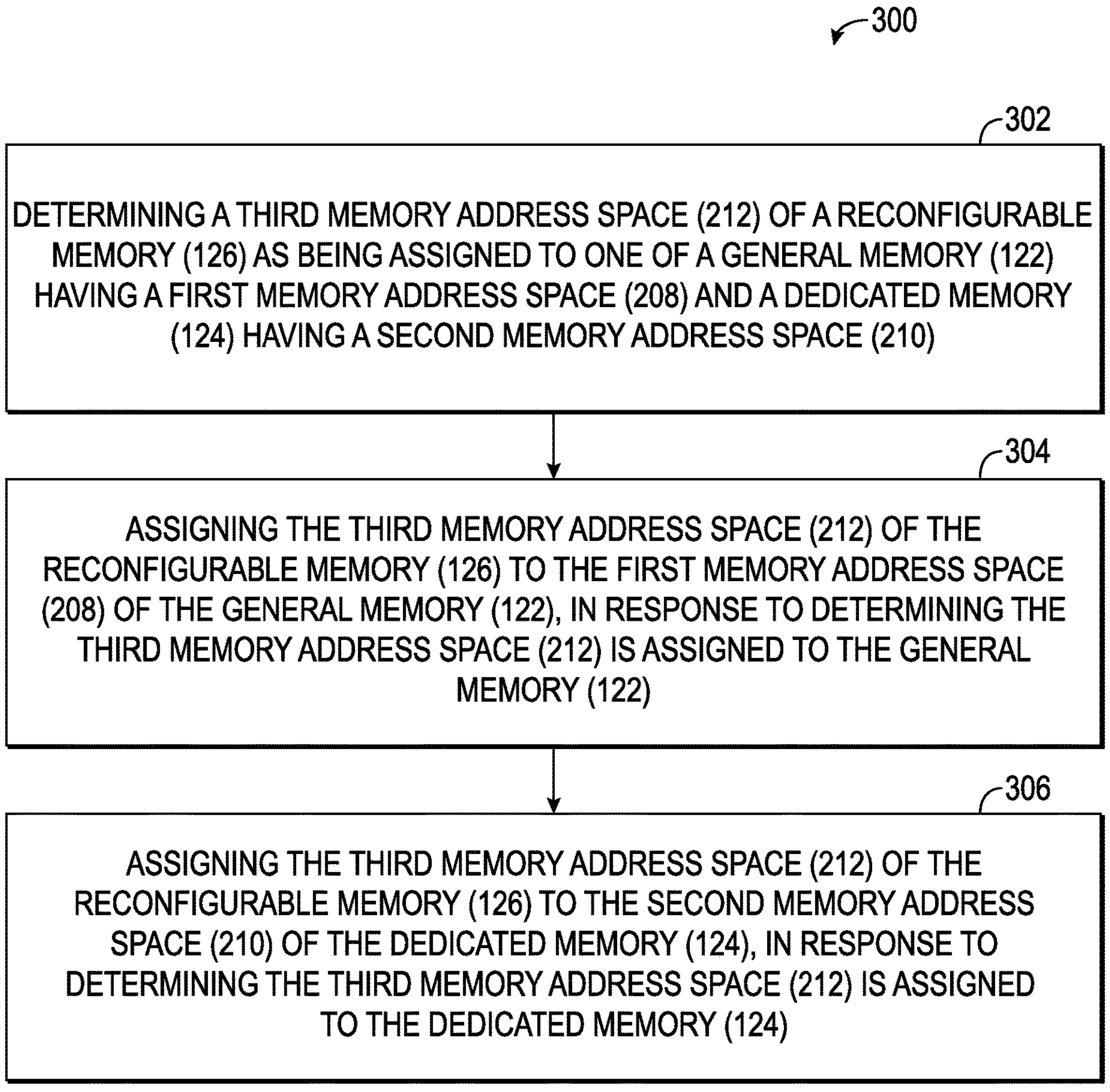
FIG. 3 is a flowchart illustrating an exemplary process of configuring a reconfigurable memory in a reconfigurable shared memory system as part of the addressable memory space of a dedicated memory and/or as part of the addressable memory space of a general memory, including but not limited to the reconfigurable shared memory systems in FIGS. 1-2.

FIG. 2 is a block diagram illustrating another exemplary processor-based system 200 that includes a processor 202 and an exemplary reconfigurable shared memory system 206. The reconfigurable shared memory system 206 can be provided as the reconfigurable shared memory system 106 in the memory system 104 in FIG. 1. Common components between the processor-based system 200 and the reconfigurable shared memory system 206 in FIG. 2, and the processor-based system 100 and the reconfigurable shared memory system 106 in FIG. 1 are shown with common components. FIG. 3 is a flowchart illustrating an exemplary process 300 of configuring a reconfigurable memory 126 in the reconfigurable shared memory system 206 as part of the addressable memory space of the dedicated memory 124 and/or part of the addressable memory space of a general memory 122. The process 300 in FIG. 3 is discussed in conjunction with FIG. 2 below.

In this regard, with reference to FIG. 2, the reconfigurable shared memory system 206 is shown that includes the general memory 122 having a first memory address space 208 according to its memory size and configuration and the dedicated memory 124 having a second memory address space 210 according to its memory size and configuration.

The memory addresses of the first and second memory address spaces 208, 210 may be exclusive of each other, or there may be another method provided in the processor 202 to allow different PUs or clients to access the general memory 122 and dedicated memory 124 using common or overlapping memory addresses. The reconfigurable shared memory system 206 also includes the reconfigurable memory 126 that has a third memory address space 212 according to its memory size and configuration. In this example, the reconfigurable shared memory system 206 includes a reconfiguration memory direction circuit 204 that is coupled to the reconfigurable memory 126. As discussed in more detail below, the reconfiguration memory direction circuit 204 is configured to determine the third memory address space 212 of the reconfigurable memory 126 as being assigned to the general memory 122 having the first memory address space 208 or the dedicated memory 124 having the second memory address space 210 (block 302 in FIG. 3). The reconfiguration memory direction circuit 204 is configured to assign the third memory address space 212 of the reconfigurable memory 126 to the first memory address space 208 of the general memory 122, in response to a reconfigurable memory configuration for the reconfigurable memory 126 indicating a general memory mapping configuration (block 304 in FIG. 3). As also discussed in more detail below, the reconfiguration memory direction circuit 204 is also configured to assign the third memory address space 212 of the reconfigurable memory 126 to the second memory address space 210 of the dedicated memory 124, in response to the reconfigurable memory configuration for the reconfigurable memory 126 indicating a dedicated memory mapping configuration (block 306 in FIG. 3).

For example, the reconfigurable memory configuration may be stored in a reconfigurable memory configuration register 207 shown in FIG. 2 that is either hardware configurable (e.g., by eFuse) or software programmable. For example, a logic state of '0' stored in the reconfigurable memory configuration register 207 may be used to indicate a general memory mapping configuration, and a logic state of '1' stored in the reconfigurable memory configuration register 207 may be used to indicate a dedicated memory mapping configuration, or vice versa.

The reconfigurable shared memory system 206 in FIG. 2 in this example includes a general memory controller 214, which in this example is a cache controller since the reconfigurable shared memory system 206 is a cache memory system. The general memory controller 214 is configured to receive memory access requests 216 that include first memory access requests 216(1) addressable to the first memory address space 208 of the general memory 122, and communicate such first memory access requests 216(1) to the general memory 122. For example, any of the PUs 108(0)-108(N) in the processor 202, including the CPU 108C, GPU 108G, and DPU 108D may be configured to provide such first memory access requests 216(1) within the first memory address space 208 of the general memory 122 through the interconnect bus 110 to the general memory controller 214. The reconfigurable shared memory system 206 in FIG. 2 in this example also includes a dedicated memory controller 218. The dedicated memory controller 218 is configured to receive memory access requests 216 as second memory access requests 216(2) addressable to the second memory address space 210 of the dedicated memory 124, and communicate such second memory access requests 216(2) to the dedicated memory 124. For example, a particular client 215 may be configured to provide such second memory access requests 216(2) within the second memory address space 210 of the dedicated memory 124 to the dedicated memory controller 218.

The reconfigurable shared memory system 206 in FIG. 2 in this example also includes the reconfiguration memory direction circuit 204. The reconfiguration memory direction circuit 204 may be a multiplexer circuit, referred to herein as reconfiguration memory multiplexer circuit 204M. The reconfiguration memory direction circuit 204 is configured to receive memory access requests 216 as third memory access requests 216(3) addressable to the third memory address space 212 of the reconfigurable memory 126. In this example, the third memory access request 216(3) can come from the general memory controller 214 or the dedicated memory controller 218. As discussed in more detail below, the general memory controller 214 or the dedicated memory controller 218 can provide third memory access requests 216(3) to the reconfiguration memory direction circuit 204 transparent to whether the general memory controller 214 or the dedicated memory controller 218 have knowledge of whether the third memory address space 212 of the reconfigurable memory 126 is configured for the respective general memory 122 or dedicated memory 124. Or, as discussed in more detail below, the general memory controller 214 and/or the dedicated memory controller 218 may have non-transparent access to memory mapping information that indicates whether the third memory address space 212 of the reconfigurable memory 126 is configured for the general memory 122 or dedicated memory 124, and then provide third memory access requests 216(3) if the third memory address space 212 of the reconfigurable memory 126 is mapped to its respective controller.

Regardless of whether or how the third memory access requests 216(3) are received by the reconfiguration memory direction circuit 204, in this example, the reconfiguration memory direction circuit 204 is configured to communicate the third memory access requests 216(3) from the general memory controller 214 if the reconfigurable memory configuration register 207 indicates a general memory mapping configuration. The reconfiguration memory direction circuit 204 is also configured to communicate the third memory access requests 216(3) from the dedicated memory controller 218 if the reconfigurable memory configuration register 207 indicates a dedicated memory mapping configuration. In this manner and example, the configuration in the reconfigurable memory configuration register 207 controls whether the third memory address space 212 of the reconfigurable memory 126 is provided as part of the first memory address space 208 of the general memory 122 or as part of the second memory address space 210 of the dedicated memory 124.

With continuing reference to FIG. 2, the reconfiguration memory direction circuit 204 in this example includes reconfiguration memory access output 2220 configured to the reconfigurable memory 126. The reconfiguration memory direction circuit 204 also includes a first reconfiguration memory access input 222(1)I and a second reconfiguration memory access input 222(2)I. The reconfiguration memory direction circuit 204 is configured to communicate (e.g., pass) the third memory access requests 216(3) on the first reconfiguration memory access input 222(1)I to the reconfiguration memory access output 2220 to be provided to the dedicated memory 126 for handling, in response to the reconfigurable memory configuration register 207 indicating the general memory mapping configuration. The reconfiguration memory direction circuit 204 is configured to communicate (e.g., pass) the third memory access requests 216(3) on the second reconfiguration memory access input 222(2)I to the reconfiguration memory access output 2220 to be provided to the reconfigurable memory 126 for handling, in response to the reconfigurable memory configuration register 207 indicating the dedicated memory mapping configuration. As discussed above, the reconfiguration memory direction circuit 204 may only selectively receive third memory access requests 216(3) to the third memory address space 212 from either the general memory controller 214 or the dedicated memory controller 218 if the general memory controller 214 or the dedicated memory controller 218 are configured to have knowledge that their memory address space is configured to include the third memory address space 212 of the reconfigurable memory 126.

With continuing reference to FIG. 2, the reconfigurable shared memory system 206 in this example also includes a general memory direction circuit 224, which may be a multiplexer circuit 224M referred to as a "general memory multiplexer circuit 224M." The general memory multiplexer circuit 224M is coupled to the general memory controller 214, the general memory 122, and the reconfiguration memory direction circuit 204. The general memory multiplexer circuit 224M is configured to receive the third memory access requests 216(3) addressable to the third memory address space 212, and communicate the third memory access requests 216(3) to the reconfiguration memory direction circuit 204. In this regard, the general memory multiplexer circuit 224M includes a general memory access input 2261 coupled to the general memory controller 214, a first general memory access output 226(1)O coupled to the general memory 122, and a second general memory access output 226(2)O coupled to the reconfiguration memory direction circuit 204. The general memory multiplexer circuit 224M is configured to receive the first memory access requests 216(1) addressable to the first memory address space 208 on the general memory access input 2261. The general memory multiplexer circuit 224M is also configured to receive the third memory access requests 216(3) addressable to the third memory address space 212 on the general memory access input 2261, either transparently or non-transparently if the general memory controller 214 has knowledge that its memory map is assigned the third memory address space 212 of the reconfigurable memory 126. The general memory multiplexer circuit 224M is configured to communicate (e.g., pass) the first memory access requests 216(1) on the first general memory access output 226(1)O to the general memory 122, and communicate (e.g., pass) the third memory access requests 216(3) on the second general memory access output 226(2)O to the reconfiguration memory direction circuit 204 to be provided to the reconfigurable memory 126.

Note that as discussed in more detail below, the general memory multiplexer circuit 224M can be configured to communicate both first memory access requests 216(1) and third memory access requests 216(3) to both the first and second general memory access outputs 226(1)O, 226(2)O if the combined general memory 208 and reconfigurable memory 212 is configured as a cache memory with cache ways split among them.

With continuing reference to FIG. 2, the reconfigurable shared memory system 206 in this example also includes a dedicated memory direction circuit 228, which may be a multiplexer circuit 228M referred to as a "dedicated memory multiplexer circuit 228M." The dedicated memory multiplexer circuit 228M is coupled to the dedicated memory controller 218, the dedicated memory 124, and the reconfiguration memory direction circuit 204. The dedicated memory multiplexer circuit 228M is configured to receive the third memory access requests 216(3) addressable to the third memory address space 212, and communicate the third memory access requests 216(3) to the reconfiguration memory direction circuit 204. In this regard, the dedicated memory multiplexer circuit 228M includes a dedicated memory access input 2301 coupled to the dedicated memory controller 218, a first dedicated memory access output 230(1)O coupled to the dedicated memory 124, and a second dedicated memory access output 230(2)O coupled to the reconfiguration memory direction circuit 204. The dedicated memory multiplexer circuit 228M is configured to receive the second memory access requests 216(2) addressable to the second memory address space 210 on the dedicated memory access input 2301. The dedicated memory multiplexer circuit 228M is also configured to receive the third memory access requests 216(3) addressable to the third memory address space 212 on the dedicated memory access input 2301, either transparently or non-transparently if the dedicated memory controller 218 has knowledge that its memory map is assigned the third memory address space 212 of the reconfigurable memory 126. The dedicated memory multiplexer circuit 228M is configured to communicate (e.g., pass) the first memory access requests 216(1) on the first dedicated memory access output 230(1)O to the dedicated memory 124, and communicate (e.g., pass) the third memory access requests 216(3) on the second dedicated memory access output 230(2)O to the reconfiguration memory direction circuit 204 to be provided to the reconfigurable memory 126.

In an example, the reconfigurable memory configuration register 207 may be configured to be reset in response to a reset of the memory system 104 or processor-based system 200. In other words, at every restart or power up of the processor-based system 200, the reconfigurable memory 126 of the reconfigurable shared memory system 206 is determined whether to be mapped into the memory address space of the general memory 122 or the dedicated memory 124. In another example, the reconfigurable memory configuration register 207 may be capable of being reconfigured dynamically during run-time of the processor-based system 200 and the reconfigurable shared memory system 206 in response to a reset of the memory system 104 or processor-based system 200. If the reconfigurable memory configuration register 207 is changed from a general memory mapping configuration to a dedicated memory mapping configuration, the general memory 122 and/or the reconfigurable memory 126 may need to be flushed and written back to system memory 116. If the reconfigurable memory configuration register 207 is changed from a dedicated memory mapping configuration to a general memory mapping configuration, the general memory 122 and/or the dedicated memory 124 may need to be flushed and written back to system memory 116.

With continuing reference to FIG. 2, in this example, reconfigurable clock direction circuit 232 is provided that controls whether a general memory clock signal 234 generated or provided by a general memory clock 236 is used to clock the reconfigurable memory 126, or whether a dedicated memory clock signal 238 generated or provided by a dedicated memory clock 240 is used to clock the reconfigurable memory 126. The general memory clock 236 provides the general memory clock signal 234 to clock the general memory 122. The dedicated memory clock 240 provides the dedicated memory clock signal 238 to clock the dedicated memory 126. Like the reconfiguration memory direction circuit 204, the reconfigurable clock direction circuit 232 can be a reconfigurable clock multiplexer circuit 232M that is controlled by the reconfigurable memory configuration register 207 as previously discussed based on whether the third memory address space 212 of the reconfigurable memory 126 is to be provided as part of the first memory address space 208 for the general memory 122 or the second memory address space 210 for the dedicated memory 126. This arrangement enables powering on and off of each of the general memory 122 and the dedicated memory 126 across different domains.

In this example, the reconfigurable clock direction circuit 232 includes a reconfiguration clock access output 2420 coupled to the reconfigurable memory 126. The reconfigurable clock direction circuit 232 also includes a first reconfiguration clock access input 242(1) and a second reconfiguration clock access input 242(2)I. The reconfigurable clock direction circuit 232 is configured to communicate (e.g., pass) the general memory clock signal 234 on the first reconfiguration clock access input 242(1)I to the reconfiguration clock access output 2420 to clock the reconfigurable memory 126 in response to the reconfigurable memory configuration register 207 indicating the general memory mapping configuration. The reconfiguration clock direction circuit 232 is configured to communicate (e.g., pass) the dedicated memory clock signal 238 on the second reconfiguration clock access input 242(2)I to the reconfiguration clock access output 2420 to clock the reconfigurable memory 126 in response to the reconfigurable memory configuration register 207 indicating the dedicated memory mapping configuration.

Figure 4:
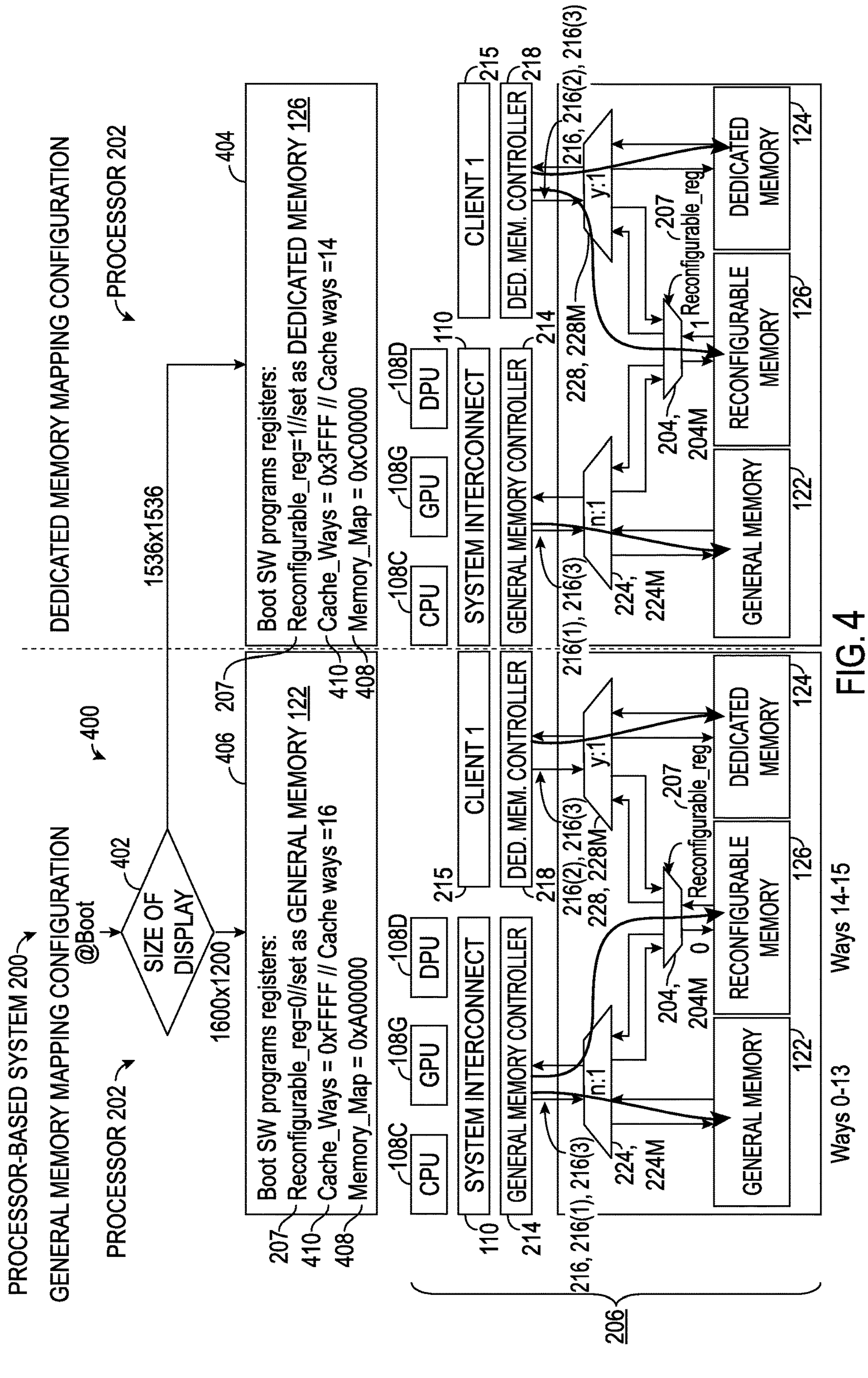
FIG. 4 is a flow diagram illustrating another exemplary process of the memory address space of the reconfigurable memory in the reconfigurable shared memory system in FIG. 2 being configured as either part of the addressable memory space of the dedicated memory or part of the addressable memory space of the general memory.

FIG. 4 is a flow diagram illustrating another exemplary process 400 of the third memory address space 212 of the reconfigurable memory 126 in the reconfigurable shared memory system 206 in FIG. 2 being configured as either part of the second memory address space 210 of the dedicated memory 124 or part of the first memory address space 208 of the general memory 122.

As shown in FIG. 4, at boot up or reset of the processor-based system 200, the firmware of the processor-based system 200 can be configured to determine the resolution of a display in which the processor-based system 200 is responsible to send a stored frame buffer in the dedicated memory 124 to be displayed (block 402 in FIG. 4). If the size of the display is such that maximum resolution is required (e.g., 1536×1536) (block 402 in FIG. 4), the reconfigurable shared memory system 206 can be configured to map the third memory address space 212 (see FIG. 2) of the reconfigurable memory 126 to the dedicated memory 124 (block 404 in FIG. 4). For example, this dedicated memory mapping configuration may be indicated by the reconfigurable memory configuration register 207 storing 0x1. In this configuration, the dedicated memory controller 218 may be configured to store a dedicated memory map 408 that is assigned both the second memory address space 210 (FIG. 2) of the dedicated memory 124 and the third memory address space 212 (FIG. 2) of the reconfigurable memory 126. The dedicated memory controller 218 can then use the dedicated memory map 408 to determine whether the memory address of received third memory access requests 216(3) are assigned to the dedicated memory map 408, and if so, generate the third memory access requests 216(3) to be provided to the dedicated memory multiplexer circuit 228M to then be provided to the reconfiguration memory multiplexer circuit 204M. As an example, the dedicated memory 124 may be configured as having fourteen (14) cache ways. To facilitate transparency of memory mapping in the dedicated memory controller 218, in another example, the second memory address space 210 (FIG. 2) of the dedicated memory 124 can be contiguous memory addresses in the dedicated memory 124 that starts at the first memory location in the dedicated memory 124, and the third memory address space 212 (FIG. 2) of the reconfigurable memory 126 starts after the second memory address space 210 of the dedicated memory 124.

In this example, when the reconfigurable memory configuration register 207 is set to map the reconfigurable memory 126 to the dedicated memory controller 218, the memory map 408 can be used to address the dedicated memory 124 and the reconfigurable memory 126 based on address range. In this example, the memory map 408 provides a memory mask, which is 0xC00000 in this example. The memory map 408 can be configured or programmed at any time, as either a static or dynamic setting, as such as solely used for mapping the reconfigurable memory 126 to the dedicated memory controller 218 in this example. If a memory address of the memory access request 216(2), 216(3) issued by the dedicated memory controller 218 matches the mask in the memory map 408 (in this example, the two (2) most significant bits for 0xC or "1100" in binary), this would mean the memory access request 216 is in the address range of 0xA00000-0xBFFFFF as a third memory access request 216(3) that would be directed by the dedicated memory multiplexer circuit 228M to the reconfigurable memory 126. In this example, if a memory address of the memory access request 216(2), 216(3) issued by the dedicated memory controller 218 does not match the mask in the memory map 408, this would mean the memory access request 216 is in the address range of 0x000000-0x9FFFFF as a second memory access request 216(2) that would be directed by the dedicated memory multiplexer circuit 228M to the dedicated memory 124.

A memory access request 216 outside the memory range of the address range of the combined dedicated memory 124 and reconfigurable memory 126 (such as due to a programming error) will generate an error to the dedicated memory controller 218 from the dedicated memory multiplexer circuit 228M.

With continuing reference to the exemplary process 400 in FIG. 4, if, however, at boot up or reset, the size of the display is such that maximum resolution is not required (e.g., 1600×1200) (block 402 in FIG. 4), the reconfigurable shared memory system 206 can be configured to map the third memory address space 212 (see FIG. 2) of the reconfigurable memory 126 to the general memory 122 (block 406 in FIG. 4). For example, this general memory mapping configuration may be indicated by the reconfigurable memory configuration register 207 storing 0x0. In this configuration, the dedicated memory controller 218 may be configured to store the general memory map 408 that is assigned both the first memory address space 208 (FIG. 2) of the general memory 122 and the third memory address space 212 (FIG. 2) of the reconfigurable memory 126. The general memory controller 214 can then use the general memory map 410 to determine whether the memory address of received third memory access requests 216(3) are assigned to the general memory map 410, and if so, generate the third memory access requests 216(3) to be provided to the general memory multiplexer circuit 224M to then be provided to the reconfiguration memory multiplexer circuit 204M.

As an example, the general memory 122 may be configured as having sixteen (16) cache ways with fourteen (14) first cache ways regardless of reconfigurable memory configuration, and two (2) extra second cache ways being provided by the reconfigurable memory 126. In other words, the general memory controller 214 can be configured to make additional cache ways available if the third memory address space 212 (FIG. 2) of the reconfigurable memory 126 is configured for the general memory 122. If desired to provide transparency of memory mapping in the general memory controller 214, in another example the general memory controller 214 can simply forward the received third memory access requests 216(3) regardless of whether the general memory controller 214 has knowledge of whether the third memory address space 212 (FIG. 2) of the reconfigurable memory 126 is configured for the general memory 122. The reconfiguration memory direction circuit 204 can be configured to not forward the received third memory access requests 216(3) to the reconfigurable memory 126 and instead a cache miss generated to the general memory controller 214.

In this example, when the reconfigurable memory configuration register 207 is set to map the reconfigurable memory 126 to the general memory controller 214, the memory map 408 is not used to address the general memory 122 and the reconfigurable memory 126 based on cache tagging. In this example, the general memory 122 and reconfigurable memory 126 are accessed based on the memory address of the memory address request 216 at the same time. Thus, first and third memory address requests 216(1), 216(3) would both be passed by the general memory multiplexer circuit 224M to the general memory 122 and reconfigurable memory 126. However, in this example, the cache ways 410 is configured to indicate the number of ways in which the general memory 122 and reconfigurable memory 126 are organized as a combined cache memory for the general memory controller 214 as well as the size of each cache way. In this example, the cache ways 410 has values indicating sixteen (16) cache ways provided among the combined general memory 122 and reconfigurable memory 126. The size of the cache ways can be designed as desired, such as the size of each cache way 410 being 0xFFFF. In this example, first memory access requests 216(1) are for cache ways 0-13 configured for the general memory 122, and third memory access requests 216(3) are for cache ways 14-15 configured for the reconfigurable memory 126. Cache tagging is used by the general memory controller 214 to distinguish between the different ways. The cache ways 410 can be configured or programmed at any time, as either a static or dynamic setting, as such as solely used for mapping the reconfigurable memory 126 to the general memory controller 214 in this example.

A memory access request 216 outside the memory range of the address range of the combined general memory 122 and reconfigurable memory 126 (such as due to a programming error) will generate an error to the general memory multiplexer circuit 224M from the dedicated memory direction circuit 228M.

Note that if the reconfigurable shared memory system 206 discussed herein provides for the reconfigurable memory 126 to be mapped to the general memory controller 214, the general memory 122 combined with the reconfigurable memory 212 does not have to be configured as a cache memory. Such combined general memory 122 combined with the reconfigurable memory 126 could provide system or general memory that is not cache memory and operate similar to that discussed above if the reconfigurable memory 126 is mapped to the dedicated memory controller 218. Likewise, if the reconfigurable shared memory system 206 discussed herein provides for the reconfigurable memory 126 to be mapped to the dedicated memory controller 218, the dedicated memory 124 combined with the reconfigurable memory 126 does not have to be configured as a system or general memory. Such combined dedicated memory 124 combined with the reconfigurable memory 126 could provide a cache memory and operate similar to that discussed above if the reconfigurable memory 126 is mapped to the general memory controller 214.

Reconfigurable shared memory system that includes a dedicated memory, a general memory, and a reconfigurable memory configured to be in the memory address space of either the dedicated memory and/or the general memory, including but not limited to the reconfigurable shared memory systems 106, 206 in FIGS. 1, 2, and 4, and according to any of the exemplary processes 300, 400 in FIGS. 3-4, and according to any aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 5:
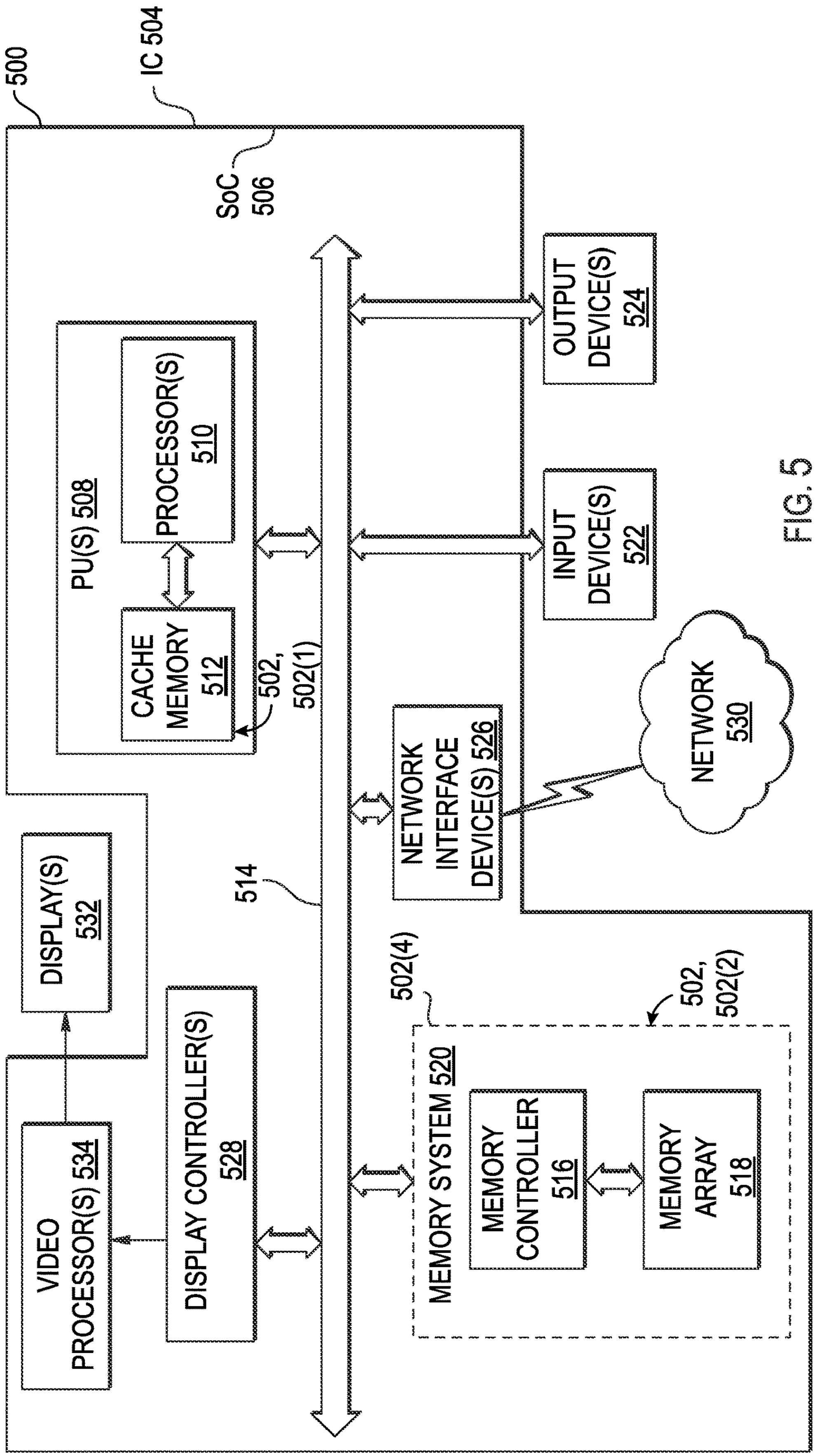
FIG. 5 is a block diagram of another exemplary processor-based system that can include a reconfigurable shared memory system that includes a dedicated memory, a general memory, and a reconfigurable memory configured to be in the memory address space of either the dedicated memory and/or the general memory, including but not limited to the reconfigurable shared memory systems in FIGS. 1, 2, and 4, and according to any of the exemplary processes in FIGS. 3-4.

FIG. 5 illustrates another example of a processor-based system 500 that can include a reconfigurable shared memory system 502 that includes a dedicated memory, a general memory, and a reconfigurable memory configured to be in the memory address space of either the dedicated memory and/or the general memory, including but not limited to the reconfigurable shared memory systems 106, 206 in FIGS. 1, 2, and 4, and according to any of the exemplary processes 300, 400 in FIGS. 3-4, and according to any aspects disclosed herein. In this example, the processor-based system 500 may be formed as an IC 504 and as a system-on-a-chip (SoC) 506. The processor-based system 500 includes a processing unit (PU) 508 that includes one or more processors 510, which may also be referred to as PU cores or processor cores. The processors 510 may be graphics processors or data processors as examples, wherein the PU 508 can be a central processing unit (CPU), a graphics processing unit (GPU), and/or a data processing unit (DPU). The PU 508 may have a cache memory 512 coupled to the PU 508 for rapid access to temporarily stored data. The cache memory 512 can include a reconfigurable shared memory system 502(1) that includes a dedicated memory, a general memory, and a reconfigurable memory configured to be in the memory address space of either the dedicated memory and/or the general memory, including but not limited to the reconfigurable shared memory systems 106, 206 in FIGS. 1, 2, and 4, and according to any of the exemplary processes 300, 400 in FIGS. 3-4, and according to any aspects disclosed herein.

With continuing reference to FIG. 5, the PU 508 is coupled to a system bus 514 and can intercouple master and slave devices included in the processor-based system 500. As is well known, the PU 508 communicates with these other devices by exchanging address, control, and data information over the system bus 514. For example, the PU 508 can communicate bus transaction requests to a memory controller 516, as an example of a slave device. Although not illustrated in FIG. 5, multiple system buses 514 could be provided, wherein each system bus 514 constitutes a different fabric.

Other master and slave devices can be connected to the system bus 514. As illustrated in FIG. 5, these devices can include a memory system 520 that includes the memory controller 516 and a memory array(s) 518, one or more input devices 522, one or more output devices 524, one or more network interface devices 526, and one or more display controllers 528, as examples. The memory system 520 can include a reconfigurable shared memory system 502(2) that includes a dedicated memory, a general memory, and a reconfigurable memory configured to be in the memory address space of either the dedicated memory and/or the general memory, including but not limited to the reconfigurable shared memory systems 106, 206 in FIGS. 1, 2, and 4, and according to any of the exemplary processes 300, 400 in FIGS. 3-4, and according to any aspects disclosed herein.

The input device(s) 522 can include any type of input device, including, but not limited to, input keys, switches, voice processors, etc. The output device(s) 524 can include any type of output device, including, but not limited to, audio, video, other visual indicators, etc. The network interface device(s) 526 can be any device configured to allow exchange of data to and from a network 530. The network 530 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 526 can be configured to support any type of communications protocol desired.

The PU 508 may also be configured to access the display controller(s) 528 over the system bus 514 to control information sent to one or more displays 532. The display controller(s) 528 sends information to the display(s) 532 to be displayed via one or more video processor(s) 534, which process the information to be displayed into a format suitable for the display(s) 532. The display(s) 532 can include any type of display, including, but not limited to, a cathode ray tube (CRT), a liquid crystal display (LCD), a plasma display, a light emitting diode (LED) display, etc.

Figure 6:
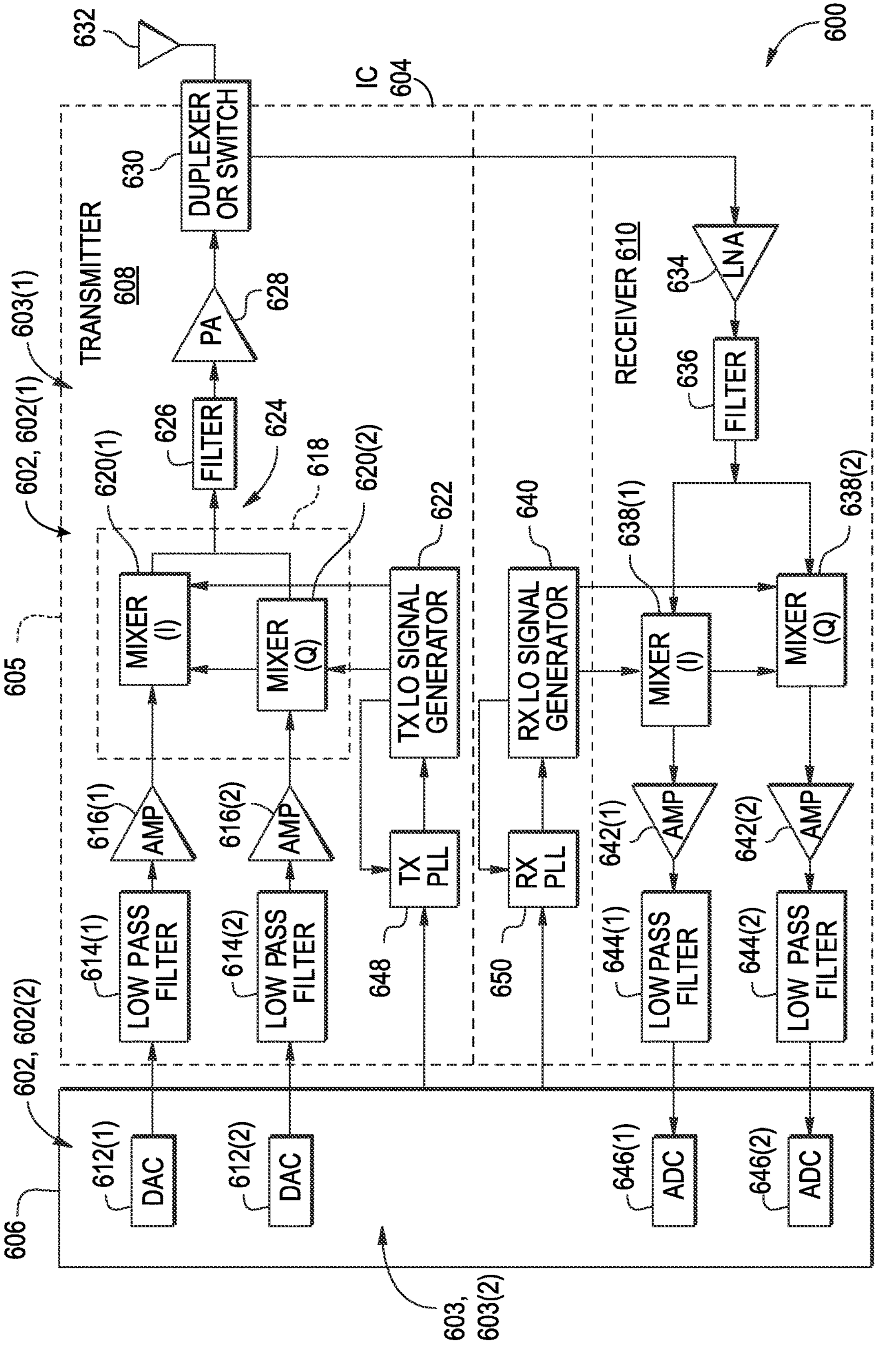
FIG. 6 is a block diagram of an exemplary wireless communications device that includes radio-frequency (RF) components that can be provided as or included in a processor-based system that includes a reconfigurable shared memory system that includes a dedicated memory, a general memory, and a reconfigurable memory configured to be in the memory address space of either the dedicated memory and/or the general memory, including but not limited to the reconfigurable shared memory systems in FIGS. 1, 2, and 4, and according to any of the exemplary processes in FIGS. 3-4.

FIG. 6 illustrates an exemplary wireless communications device 600 that includes radio frequency (RF) components that can be provided as or included in a processor-based system 602 that includes a reconfigurable shared memory system 603 that includes a dedicated memory, a general memory, and a reconfigurable memory configured to be in the memory address space of either the dedicated memory and/or the general memory, including but not limited to the reconfigurable shared memory systems 106, 206 in FIGS. 1, 2, and 4, and according to any of the exemplary processes 300, 400 in FIGS. 3-4, and according to any aspects disclosed herein. The wireless communications device 600 may be included or be provided in any of the above-referenced processor-based devices, as examples. The wireless communications device 600 may be provided in an IC 604.

As shown in FIG. 6, the wireless communications device 600 includes a transceiver 605 and a data processor 606. The transceiver 605 and the data processor 606 may each include respective reconfigurable shared memory systems 603(1), 603(2) that include a dedicated memory, a general memory, and a reconfigurable memory configured to be in the memory address space of either the dedicated memory and/or the general memory, including but not limited to the reconfigurable shared memory systems 106, 206 in FIGS. 1, 2, and 4, and according to any of the exemplary processes 300, 400 in FIGS. 3-4, and according to any aspects disclosed herein. The data processor 606 may include a memory to store data and program codes. The transceiver 604 includes a transmitter 608 and a receiver 610 that support bi-directional communications. In general, the wireless communications device 600 may include any number of transmitters 608 and/or receivers 610 for any number of communication systems and frequency bands. All or a portion of the transceiver 605 may be implemented on one or more analog ICs, RF ICs (RFICs), mixed-signal ICs, etc.

The transmitter 608 or the receiver 610 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 610. In the direct-conversion architecture, a signal is frequency-converted between RF and baseband in one stage. The super-heterodyne and direct-conversion architectures may use different circuit blocks and/or have different requirements. In the wireless communications device 600 in FIG. 6, the transmitter 608 and the receiver 610 are implemented with the direct-conversion architecture.

In the transmit path, the data processor 606 processes data to be transmitted and provides I and Q analog output signals to the transmitter 608. In the exemplary wireless communications device 600, the data processor 606 includes digital-to-analog converters (DACs) 612(1), 612(2) for converting digital signals generated by the data processor 606 into the I and Q analog output signals, e.g., I and Q output currents, for further processing.

Within the transmitter 608, lowpass filters 614(1), 614(2) filter the I and Q analog output signals, respectively, to remove undesired signals caused by the prior digital-to-analog conversion. Amplifiers (AMPs) 616(1), 616(2) amplify the signals from the lowpass filters 614(1), 614(2), respectively, and provide I and Q baseband signals. An upconverter 618 upconverts the I and Q baseband signals with I and Q transmit (TX) local oscillator (LO) signals through mixers 620(1), 620(2) from a TX LO signal generator 622 to provide an upconverted signal 624. A filter 626 filters the upconverted signal 624 to remove undesired signals caused by the frequency up-conversion as well as noise in a receive frequency band. A power amplifier (PA) 628 amplifies the upconverted signal 624 from the filter 626 to obtain the desired output power level and provides a transmit RF signal. The transmit RF signal is routed through a duplexer or switch 630 and transmitted via an antenna 632.

In the receive path, the antenna 632 receives signals transmitted by base stations and provides a received RF signal, which is routed through the duplexer or switch 630 and provided to a low noise amplifier (LNA) 634. The duplexer or switch 630 is designed to operate with a specific receive (RX)-to-TX duplexer frequency separation, such that RX signals are isolated from TX signals. The received RF signal is amplified by the LNA 634 and filtered by a filter 636 to obtain a desired RF input signal. Down-conversion mixers 638(1), 638(2) mix the output of the filter 636 with I and Q RX LO signals (i.e., LO_I and LO_Q) from an RX LO signal generator 640 to generate I and Q baseband signals. The I and Q baseband signals are amplified by AMPs 642(1), 642(2) and further filtered by lowpass filters 644(1), 644(2) to obtain I and Q analog input signals, which are provided to the data processor 606. In this example, the data processor 606 includes analog-to-digital converters (ADCs) 646(1), 646(2) for converting the analog input signals into digital signals to be further processed by the data processor 606.

In the wireless communications device 600 of FIG. 6, the TX LO signal generator 622 generates the I and Q TX LO signals used for frequency up-conversion, while the RX LO signal generator 640 generates the I and Q RX LO signals used for frequency down-conversion. Each LO signal is a periodic signal with a particular fundamental frequency. A TX phase-locked loop (PLL) circuit 648 receives timing information from the data processor 606 and generates a control signal used to adjust the frequency and/or phase of the TX LO signals from the TX LO signal generator 622. Similarly, an RX PLL circuit 650 receives timing information from the data processor 606 and generates a control signal used to adjust the frequency and/or phase of the RX LO signals from the RX LO signal generator 640.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A memory system, comprising:
   - a general memory having a first memory address space;
   - a dedicated memory having a second memory address space;
   - a reconfigurable memory having a third memory address space; and
   - a reconfiguration memory direction circuit coupled to reconfigurable memory, the reconfiguration memory direction circuit configured to:
     - assign the third memory address space of the reconfigurable memory to the first memory address space of the general memory, in response to a reconfigurable memory configuration for the reconfigurable memory indicating a general memory mapping configuration; and
     - assign the third memory address space of the reconfigurable memory to the second memory address space of the dedicated memory, in response to the reconfigurable memory configuration for the reconfigurable memory indicating a dedicated memory mapping configuration.
2. The memory system of clause 1, wherein the reconfigurable memory configuration comprises a reconfigurable memory configuration register configured to store the reconfigurable memory configuration for the reconfigurable memory.
3. The memory system according to any of clauses 1-2, further comprising:
   - a general memory controller configured to:
     - receive a first memory access request addressable to the first memory address space; and
     - communicate the first memory access request to the general memory; and
   - a dedicated memory controller configured to:

receive a second memory access request addressable to the second memory address space; and communicate the second memory access request to the dedicated memory;

wherein:

the reconfiguration memory direction circuit is coupled to the general memory controller and the dedicated memory controller; and the reconfiguration memory direction circuit is further configured to:

receive a third memory access request addressable to the third memory address space from the general memory controller;

receive the third memory access request addressable to the third memory address space from the dedicated memory controller;

communicate the third memory access request from the general memory controller to the reconfigurable memory, in response to the reconfigurable memory configuration for the reconfigurable memory indicating the general memory mapping configuration; and communicate the third memory access request from the dedicated memory controller to the reconfigurable memory, in response to the reconfigurable memory configuration for the reconfigurable memory indicating the dedicated memory mapping configuration.

4. The memory system of clause 3, wherein the reconfiguration memory direction circuit comprises a reconfiguration memory multiplexer circuit comprising:

a reconfiguration memory access output coupled to the reconfigurable memory;

a first reconfiguration memory access input; and a second reconfiguration memory access input;

wherein:

the reconfiguration memory multiplexer circuit is configured to:

receive the third memory access request from the general memory controller on the first reconfiguration memory access input;

receive the third memory access request from the dedicated memory controller on the second reconfiguration memory access input;

communicate the third memory access request on the first reconfiguration memory access input to the reconfiguration memory access output, in response to the reconfigurable memory configuration for the reconfigurable memory indicating the general memory mapping configuration; and communicate the third memory access request on the second reconfiguration memory access input to the reconfiguration memory access output, in response to the reconfigurable memory configuration for the reconfigurable memory indicating the dedicated memory mapping configuration.

5. The memory system according to any of clauses 3-4, further comprising:

a general memory direction circuit coupled to the general memory controller and the general memory;

the general memory direction circuit configured to:

receive the third memory access request addressable to the third memory address space; and communicate the third memory access request to the reconfiguration memory direction circuit.

6. The memory system of clause 5, wherein the general memory direction circuit comprises a general memory multiplexer circuit comprising:

a general memory access input;

a first general memory access output coupled to the general memory; and a second general memory access output coupled to the reconfiguration memory direction circuit;

wherein:

the general memory multiplexer circuit is configured to:

receive the first memory access request addressable to the first memory address space on the general memory access input;

receive the third memory access request addressable to the third memory address space on the general memory access input;

communicate the first memory access request on the first general memory access output to the general memory; and communicate the third memory access request on the second general memory access output to the reconfiguration memory direction circuit.

7. The memory system of clause 3, further comprising:

a dedicated memory direction circuit coupled to the dedicated memory controller and the dedicated memory;

the dedicated memory direction circuit configured to:

receive the third memory access request addressable to the third memory address space; and communicate the third memory access request to the reconfiguration memory direction circuit.

8. The memory system of clause 7, wherein the dedicated memory direction circuit comprises a dedicated memory multiplexer circuit comprising:

a dedicated memory access input;

a first dedicated memory access output coupled to the dedicated memory; and a second dedicated memory access output coupled to the reconfiguration memory direction circuit;

wherein:

the dedicated memory multiplexer circuit is configured to:

receive the second memory access request addressable to the second memory address space on the dedicated memory access input;

receive the third memory access request addressable to the third memory address space on the dedicated memory access input; and communicate the second memory access request on the first dedicated memory access output to the dedicated memory; and communicate the third memory access request on the second dedicated memory access output to the reconfiguration memory direction circuit.

9. The memory system according to any of clauses 1-8, wherein the reconfigurable memory configuration is configured to be reset in response to a reset of the memory system.

10. The memory system according to any of clauses 1-9, wherein the reconfigurable memory configuration is configured to be dynamically changed during operation of the memory system.

11. The memory system according to any of clauses 3-8, further comprising:

a dedicated memory map configured to be assigned to:

the second memory address space; and the third memory address space, in response to the reconfigurable memory configuration for the reconfigurable memory indicating the dedicated memory mapping configuration;

wherein:

the dedicated memory controller is further configured to:

receive a dedicated memory access request addressable to the third memory address space; and in response to receiving the dedicated memory access request to the third memory address space:

determine whether the third memory address space is assigned to the dedicated memory map; and in response to determining the third memory address space is assigned to the dedicated memory map:

generate the third memory access request to the third memory address space.

12. The memory system according to any of clauses 7-8, wherein the dedicated memory controller is further configured to:

receive the third memory access request addressable to the third memory address space; and communicate the third memory access request to the dedicated memory direction circuit.

13. The memory system of clause 12, wherein:

the second memory address space of the dedicated memory is in contiguous memory addresses in the dedicated memory and starts at a first memory location in the dedicated memory; and the third memory address space of the reconfigurable memory is in contiguous memory addresses in the reconfigurable memory and starts after the second memory address space.

14. The memory system according to any of clauses 7-8, wherein:

the general memory comprises a cache memory;

the general memory controller comprises a cache controller, the cache controller further configured to:

receive the third memory access request addressable to the third memory address space;

the dedicated memory direction circuit is further configured to return a memory access request miss in response to the reconfigurable memory configuration for the reconfigurable memory indicating the dedicated memory mapping configuration; and the general memory controller is further configured to:

generate a cache miss for the third memory access request in response to the memory access request miss.

15. The memory system of clause 14, further comprising:

a general memory map configured to be assigned to:

the first memory address space; and the third memory address space, in response to the reconfigurable memory configuration for the reconfigurable memory indicating the general memory mapping configuration;

wherein:

the cache controller is further configured to:

receive a general memory access request addressable to the third memory address space; and in response to receiving the general memory access request to the third memory address space:

determine whether the third memory address space is assigned to the general memory map; and in response to determining the third memory address space is assigned to the general memory map:

generate the third memory access request to the third memory address space.

16. The memory system according to any of clauses 3-8, wherein:

the general memory comprises a cache memory;

the general memory controller comprises a cache controller, the cache controller comprising:

a cache memory map configured to be assigned to:

a plurality of first ways to the first memory address space; and a plurality of second ways to the third memory address space, in response to the reconfigurable memory configuration for the reconfigurable memory indicating the general memory mapping configuration;

wherein:

the cache controller is further configured to:

receive a general memory access request addressable to the third memory address space; and in response to receiving the general memory access request to the third memory address space:

determine whether the third memory address space is to a second way of the plurality of second ways in the cache memory map; and in response to determining the third memory address space is to the second way of the plurality of second ways:

generate the third memory access request to the second way of the plurality of second ways to the third memory address space.

17. The memory system according to any of clauses 7-8, wherein the general memory controller is further configured to:

receive the third memory access request addressable to the third memory address space; and communicate the third memory access request to the dedicated memory direction circuit.

18. The memory system according to any of clauses 1-17, further comprising:

a general memory clock circuit configured to generate a general memory clock signal to clock the general memory;

a dedicated memory clock circuit configured to generate a dedicated memory clock signal to clock the dedicated memory; and a reconfigurable clock direction circuit configured to:

receive the general memory clock signal;

receive the dedicated memory clock signal;

communicate the general memory clock signal to clock the reconfigurable memory, in response to the reconfigurable memory configuration for the reconfigurable memory indicating the general memory mapping configuration; and communicate the dedicated memory clock signal to clock to the reconfigurable memory, in response to the reconfigurable memory configuration for the reconfigurable memory indicating the dedicated memory mapping configuration.

19. The memory system of clause 18, wherein the reconfigurable clock direction circuit comprises a reconfigurable clock multiplexer circuit comprising:
a reconfigurable clock access output;
a first general clock access input coupled to the general memory clock circuit; and
a second dedicated clock access input coupled to the dedicated memory clock circuit;
wherein:
the reconfigurable clock multiplexer circuit is configured to:
receive the general memory clock signal;
receive the dedicated memory clock signal;
communicate the general memory clock signal on the reconfigurable clock access output, in response to the reconfigurable memory configuration for the reconfigurable memory indicating the general memory mapping configuration; and
communicate the dedicated memory clock signal on the reconfigurable clock access output, in response to the reconfigurable memory configuration for the reconfigurable memory indicating the dedicated memory mapping configuration.

20. The memory system according to any of clauses 1-19, wherein:
the general memory comprises a general static random access memory (SRAM);
the dedicated memory comprises a dedicated SRAM; and
the reconfigurable memory comprises a reconfigurable SRAM.

21. The memory system according to any of clauses 1-20, wherein the dedicated memory is configured to store a frame buffer.

22. The memory system according to any of clauses 1-21 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

23. A method of reconfiguring a reconfigurable memory as part of an addressable address space of another memory in a memory system, comprising:
determining a third memory address space of a reconfigurable memory as being assigned to one of a general memory having a first memory address space and a dedicated memory having a second memory address space;
assigning the third memory address space of the reconfigurable memory to the first memory address space of the general memory, in response to determining the third memory address space is assigned to the general memory; and
assigning the third memory address space of the reconfigurable memory to the second memory address space of the dedicated memory, in response to determining the third memory address space is assigned to the general memory.

24. The method of clause 23, further comprising:
receiving a first memory access request addressable to the first memory address space in a general memory controller;
communicating the first memory access request to the general memory;
receiving a third memory access request addressable to the third memory address space from the general memory controller; and
communicating the third memory access request from the general memory controller to the reconfigurable memory, in response to determining the third memory address space is assigned to the dedicated memory.

25. The method according to any of clauses 23-24, further comprising:
receiving a second memory access request addressable to the second memory address space in a dedicated memory controller;
communicating the second memory access request to the dedicated memory;
receiving a third memory access request addressable to the third memory address space from the dedicated memory controller; and
communicating the third memory access request from the dedicated memory controller to the reconfigurable memory, in response to the reconfigurable memory configuration for the reconfigurable memory indicating the dedicated memory mapping configuration.

26. The method according to any of clauses 23-25, further comprising:
assigning the second memory address space and the third memory address space to a dedicated memory map, in response to determining the third memory address space is assigned to the dedicated memory; and
receiving a dedicated memory access request addressable to the third memory address space; and
in response to receiving the dedicated memory access request to the third memory address space:
determining whether the third memory address space is assigned to the dedicated memory map; and
in response to determining the third memory address space is assigned to the dedicated memory map:
generating the third memory access request to the third memory address space.

27. The method of clause 24, further comprising:
receiving the third memory access request addressable to the third memory address space from the general memory controller in response to determining the third memory address space is assigned to the dedicated memory; and
generating a cache miss for the third memory access request.

28. The method according to any of clauses 23-27, further comprising:
assigning a general memory map to the first memory address space and the third memory address space, in response to determining the third memory address space is assigned to the general memory;
receiving a general memory access request addressable to the third memory address space; and in response to receiving the general memory access request to the third memory address space:
determining whether the third memory address space is assigned to the general memory map; and
in response to determining the third memory address space is assigned to the general memory map:
generating the third memory access request to the third memory address space.

29. The method according to any of clauses 23-28, further comprising:
assigning a cache memory map to a plurality of first ways to the first memory address space and a plurality of second ways to the third memory address space, in response to determining the third memory address space is assigned to the general memory;
receiving a general memory access request addressable to the third memory address space; and
in response to receiving the general memory access request to the third memory address space:
determining whether the third memory address space is to a second way of the plurality of second ways in the cache memory map; and
in response to determining the third memory address space is to the second way of the plurality of second ways:
generating the third memory access request to the second way of the plurality of second ways to the third memory address space.

What is claimed is:

1. A memory system in a processor-based system, comprising:
a general memory having a first memory address space addressable by each of a plurality of processing units in the processor-based system;
a dedicated memory having a second memory address space exclusively addressable by a subset of processing units from the plurality of processing units;
a reconfigurable memory having a third memory address space; and
a reconfiguration memory direction circuit coupled to reconfigurable memory, the reconfiguration memory direction circuit configured to:
assign the third memory address space of the reconfigurable memory to the first memory address space of the general memory, in response to a reconfigurable memory configuration for the reconfigurable memory indicating a general memory mapping configuration; and
assign the third memory address space of the reconfigurable memory to the second memory address space of the dedicated memory, in response to the reconfigurable memory configuration for the reconfigurable memory indicating a dedicated memory mapping configuration.

2. The memory system of claim 1, wherein the reconfigurable memory configuration comprises a reconfigurable memory configuration register configured to store the reconfigurable memory configuration for the reconfigurable memory.

3. The memory system of claim 1, further comprising:
a general memory controller configured to:
receive a first memory access request from the first processing unit of the plurality of processing units addressable to the first memory address space; and
communicate the first memory access request to the general memory; and
a dedicated memory controller configured to:
receive a second memory access request from a second processing unit of the subset of processing units addressable to the second memory address space; and
communicate the second memory access request to the dedicated memory;
wherein:
the reconfiguration memory direction circuit is coupled to the general memory controller and the dedicated memory controller; and
the reconfiguration memory direction circuit is further configured to:
receive a third memory access request from the first processing unit of the plurality of processing units addressable to the third memory address space from the general memory controller;
receive the third memory access request from the second processing unit of subset of processing units addressable to the third memory address space from the dedicated memory controller;
communicate the third memory access request from the general memory controller to the reconfigurable memory, in response to the reconfigurable memory configuration for the reconfigurable memory indicating the general memory mapping configuration; and
communicate the third memory access request from the dedicated memory controller to the reconfigurable memory, in response to the reconfigurable memory configuration for the reconfigurable memory indicating the dedicated memory mapping configuration.

4. The memory system of claim 3, wherein the reconfiguration memory direction circuit comprises a reconfiguration memory multiplexer circuit comprising:
a reconfiguration memory access output coupled to the reconfigurable memory;
a first reconfiguration memory access input; and
a second reconfiguration memory access input;
wherein:
the reconfiguration memory multiplexer circuit is configured to:
receive the third memory access request from the general memory controller on the first reconfiguration memory access input;
receive the third memory access request from the dedicated memory controller on the second reconfiguration memory access input;
communicate the third memory access request on the first reconfiguration memory access input to the reconfiguration memory access output, in response to the reconfigurable memory configuration for the reconfigurable memory indicating the general memory mapping configuration; and
communicate the third memory access request on the second reconfiguration memory access input to the reconfiguration memory access output, in response to the reconfigurable memory configuration for the reconfigurable memory indicating the dedicated memory mapping configuration.

5. The memory system of claim 3, further comprising:
a general memory direction circuit coupled to the general memory controller and the general memory;
the general memory direction circuit configured to:
receive the third memory access request addressable to the third memory address space; and communicate the third memory access request to the reconfiguration memory direction circuit.

6. The memory system of claim 5, wherein the general memory direction circuit comprises a general memory multiplexer circuit comprising:
a general memory access input;
a first general memory access output coupled to the general memory; and
a second general memory access output coupled to the reconfiguration memory direction circuit;
wherein:
the general memory multiplexer circuit is configured to:
receive the first memory access request addressable to the first memory address space on the general memory access input;
receive the third memory access request addressable to the third memory address space on the general memory access input;
communicate the first memory access request on the first general memory access output to the general memory; and
communicate the third memory access request on the second general memory access output to the reconfiguration memory direction circuit.

7. The memory system of claim 3, further comprising:
a dedicated memory direction circuit coupled to the dedicated memory controller and the dedicated memory;
the dedicated memory direction circuit configured to:
receive the third memory access request addressable to the third memory address space; and
communicate the third memory access request to the reconfiguration memory direction circuit.

8. The memory system of claim 7, wherein the dedicated memory direction circuit comprises a dedicated memory multiplexer circuit comprising:
a dedicated memory access input;
a first dedicated memory access output coupled to the dedicated memory; and
a second dedicated memory access output coupled to the reconfiguration memory direction circuit;
wherein:
the dedicated memory multiplexer circuit is configured to:
receive the second memory access request addressable to the second memory address space on the dedicated memory access input;
receive the third memory access request addressable to the third memory address space on the dedicated memory access input; and
communicate the second memory access request on the first dedicated memory access output to the dedicated memory; and
communicate the third memory access request on the second dedicated memory access output to the reconfiguration memory direction circuit.

9. The memory system of claim 1, wherein the reconfigurable memory configuration is configured to be reset in response to a reset of the memory system.

10. The memory system of claim 1, wherein the reconfigurable memory configuration is configured to be dynamically changed during operation of the memory system.

11. The memory system of claim 3, further comprising:
a dedicated memory map configured to be assigned to:
the second memory address space; and
the third memory address space, in response to the reconfigurable memory configuration for the reconfigurable memory indicating the dedicated memory mapping configuration;
wherein:
the dedicated memory controller is further configured to:
receive a dedicated memory access request addressable to the third memory address space; and
in response to receiving the dedicated memory access request to the third memory address space:
determine whether the third memory address space is assigned to the dedicated memory map; and
in response to determining the third memory address space is assigned to the dedicated memory map:
generate the third memory access request to the third memory address space.

12. The memory system of claim 7, wherein the dedicated memory controller is further configured to:
receive the third memory access request addressable to the third memory address space; and
communicate the third memory access request to the dedicated memory direction circuit.

13. The memory system of claim 12, wherein:
the second memory address space of the dedicated memory is in contiguous memory addresses in the dedicated memory and starts at a first memory location in the dedicated memory; and
the third memory address space of the reconfigurable memory is in contiguous memory addresses in the reconfigurable memory and starts after the second memory address space.

14. The memory system of claim 7, wherein:
the general memory comprises a cache memory;
the general memory controller comprises a cache controller, the cache controller further configured to:
receive the third memory access request addressable to the third memory address space;
the dedicated memory direction circuit is further configured to return a memory access request miss to the general memory controller in response to the reconfigurable memory configuration for the reconfigurable memory indicating the dedicated memory mapping configuration; and
the general memory controller is further configured to:
generate a cache miss for the third memory access request in response to the memory access request miss returned by the dedicated memory direction circuit.

15. The memory system of claim 14, further comprising:
a general memory map configured to be assigned to:
the first memory address space; and
the third memory address space, in response to the reconfigurable memory configuration for the reconfigurable memory indicating the general memory mapping configuration;
wherein:
the cache controller is further configured to:
receive a general memory access request addressable to the third memory address space; and
in response to receiving the general memory access request to the third memory address space:
determine whether the third memory address space is assigned to the general memory map; and in response to determining the third memory address space is assigned to the general memory map:

generate the third memory access request to the third memory address space.

16. The memory system of claim 3, wherein:

the general memory comprises a cache memory;

the general memory controller comprises a cache controller, the cache controller comprising:

a cache memory map configured to be assigned to:

a plurality of first ways to the first memory address space; and a plurality of second ways to the third memory address space, in response to the reconfigurable memory configuration for the reconfigurable memory indicating the general memory mapping configuration;

wherein:

the cache controller is further configured to:

receive a general memory access request addressable to the third memory address space; and in response to receiving the general memory access request to the third memory address space:

generate the third memory access request to the second way of the plurality of second ways to the third memory address space.

17. The memory system of claim 7, wherein the general memory controller is further configured to:

receive the third memory access request addressable to the third memory address space; and communicate the third memory access request to the dedicated memory direction circuit.

18. The memory system of claim 1, further comprising:

a general memory clock circuit configured to generate a general memory clock signal to clock the general memory;

a dedicated memory clock circuit configured to generate a dedicated memory clock signal to clock the dedicated memory; and a reconfigurable clock direction circuit configured to:

receive the general memory clock signal;

receive the dedicated memory clock signal;

communicate the general memory clock signal to clock the reconfigurable memory, in response to the reconfigurable memory configuration for the reconfigurable memory indicating the general memory mapping configuration; and communicate the dedicated memory clock signal to clock to the reconfigurable memory, in response to the reconfigurable memory configuration for the reconfigurable memory indicating the dedicated memory mapping configuration.

19. The memory system of claim 18, wherein the reconfigurable clock direction circuit comprises a reconfigurable clock multiplexer circuit comprising:

a reconfigurable clock access output;

a first general clock access input coupled to the general memory clock circuit; and a second dedicated clock access input coupled to the dedicated memory clock circuit;

wherein:

the reconfigurable clock multiplexer circuit is configured to:

receive the general memory clock signal;

receive the dedicated memory clock signal;

communicate the general memory clock signal on the reconfigurable clock access output, in response to the reconfigurable memory configuration for the reconfigurable memory indicating the general memory mapping configuration; and communicate the dedicated memory clock signal on the reconfigurable clock access output, in response to the reconfigurable memory configuration for the reconfigurable memory indicating the dedicated memory mapping configuration.

20. The memory system of claim 1, wherein:

the general memory comprises a general static random access memory (SRAM);

the dedicated memory comprises a dedicated SRAM; and the reconfigurable memory comprises a reconfigurable SRAM.

21. The memory system of claim 1, wherein the dedicated memory is configured to store a frame buffer.

22. The memory system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

23. A method of reconfiguring a reconfigurable memory as part of an addressable address space of another memory in a memory system in a processor-based system, comprising:

determining a third memory address space of a reconfigurable memory as being assigned to one of a general memory having a first memory address space addressable by each of a plurality of processing units in the processor-based system and a dedicated memory having a second memory address space exclusively addressable by a subset of processing units of the plurality of processing units;

assigning the third memory address space of the reconfigurable memory to the first memory address space of the general memory, in response to determining the third memory address space is assigned to the general memory; and assigning the third memory address space of the reconfigurable memory to the second memory address space of the dedicated memory, in response to determining the third memory address space is assigned to the dedicated memory.

24. The method of claim 23, further comprising:

receiving a first memory access request from a first processing unit of the plurality of processing units addressable to the first memory address space in a general memory controller;

communicating the first memory access request to the general memory;

receiving a third memory access request from the first processing unit of the plurality of processing units addressable to the third memory address space from the general memory controller; and communicating the third memory access request from the general memory controller to the reconfigurable memory, in response to determining the third memory address space is assigned to the general memory.

25. The method of claim 23, further comprising:

receiving a second memory access request from a second processing unit of the subset of processing units addressable to the second memory address space in a dedicated memory controller;

communicating the second memory access request to the dedicated memory;

receiving a third memory access request from the second processing unit of the subset of processing units addressable to the third memory address space from the dedicated memory controller; and communicating the third memory access request from the dedicated memory controller to the reconfigurable memory, in response to the reconfigurable memory configuration for the reconfigurable memory indicating the dedicated memory mapping configuration.

26. The method of claim 23, further comprising:

assigning the second memory address space and the third memory address space to a dedicated memory map, in response to determining the third memory address space is assigned to the dedicated memory; and receiving a dedicated memory access request addressable from a second processing unit of the subset of processing units to the third memory address space; and in response to receiving the dedicated memory access request to the third memory address space:

determining whether the third memory address space is assigned to the dedicated memory map; and in response to determining the third memory address space is assigned to the dedicated memory map:

generating the third memory access request to the third memory address space.

27. The method of claim 24, further comprising:

receiving the third memory access request addressable to the third memory address space from the general memory controller in response to determining the third memory address space is assigned to the dedicated memory; and generating a cache miss for the third memory access request.

28. The method of claim 23, further comprising:

assigning a general memory map to the first memory address space and the third memory address space, in response to determining the third memory address space is assigned to the general memory;

receiving a general memory access request from a first processing unit of the subset of processing units addressable to the third memory address space; and in response to receiving the general memory access request to the third memory address space:

determining whether the third memory address space is assigned to the general memory map; and in response to determining the third memory address space is assigned to the general memory map:

generating the third memory access request to the third memory address space.

29. The method of claim 23, further comprising:

assigning a cache memory map to a plurality of first ways to the first memory address space and a plurality of second ways to the third memory address space, in response to determining the third memory address space is assigned to the general memory;

receiving a general memory access request from a first processing unit of the subset of processing units addressable to the third memory address space; and in response to receiving the general memory access request to the third memory address space:

generating the third memory access request to the second way of the plurality of second ways to the third memory address space.

* * * * *